Patented Nov. 28, 1944

2,363,893

UNITED STATES PATENT OFFICE 2,363,893

MODIFIED PHENOL-ALDEHYDE RESINOUS MATERIALS AND PROCESS OF MAKING SAME

Jean Baptiste Monier, Montreal, Quebec, Canada

No Drawing. Application April 7, 1941, Serial No. 387,362. In France March 8, 1937

13 Claims. (Cl. 260—7)

This invention relates broadly to improved synthetic resinous materials, being condensation products of a phenolic body and a body containing an active aldehyde group, the said condensation products being characterized by the inclusion therein of a new modifying and stabilizing agent, and relates also to the process of making such resinous materials. More particularly, the invention relates to modified condensation products of phenol and formaldehyde and to the process of making same.

It is well known that condensation products of phenolic and aldehydic bodies, and particularly condensation products of phenolic bodies and formaldehyde in general use have, in general, the great disadvantage that they are brittle, inflexible and inelastic and are not stable as to colour and hardness. Moreover, phenol-formaldehyde condensation products are initially coloured, ranging from pale yellow through red and brown to black, according to the method of manufacture. So far as I am aware, a water-white or colourless, colour and hardness stable phenol-formaldehyde condensation product has never been produced prior to my invention.

The primary object of the invention is to produce modified resinous reaction products of phenolic bodies and bodies containing an active aldehyde group, which products may exist in either a liquid or a solid state and in the latter case may be soluble and thermoplastic or may be insoluble and infusible, and which are all completely stable and exhibit improved characteristics of flexibility, elasticity, adhesiveness, resistivity to shock and improved mechanical and dielectric properties, according to the physical state of the resin.

A further object is to provide a colourless modified phenol-formaldehyde resin.

A still further object is to provide completely stable phenol-formaldehyde resins, either permanently thermoplastic or permanently infusible.

Various other objects and the advantages of the invention may be ascertained from the following description.

The invention consists broadly in condensation products of phenolic bodies and bodies containing an active aldehyde group, the said products being modified by the presence of a reaction product of gelatin or glue and a lower fatty acid, introduced either before, during or after the condensation reaction; and consists further in the process of producing such modified phenolic resinous products.

In greater detail, the invention consists in the features and combinations of features herein disclosed, together with all such substitutions of equivalents therefor and all such modifications thereof as are within the scope of the appended claims.

The invention is applicable to condensation products of phenolic bodies generally, and particularly phenol, cresol, naphthol and resorcinol, including bodies yielding the phenol radical in the condensing reaction; with bodies containing an active aldehyde group, such as aldehydic bodies generally, either aliphatic or aromatic, and particularly formaldehyde, and contemplates the addition of the modifying agent to the other reactants before or during the condensation or after the condensation but before dehydration of the reaction product.

While the modifying agents used according to this invention are generally described as reaction products of gelatin or glue and a lower fatty acid, for example gelatin formate, acetate, propionate or butyrate, the gelatin products or derivatives now preferred are the acetates. For simplicity of explanation, the following description will be confined to processes and products involving the use of gelatin acetates but it will be understood the invention is not thereby limited to the employment of gelatin acetates.

The resin modifying agents contemplated for use in this invention include the gelatin-fatty acid reaction products either pure or with the addition of one or more of other resin modifying agents, such as natural resins, boracic acid and a methylene amine, such as hexamethylenetetramine.

It is well known that gelatin and glue are hardened by addition of formaldehyde, but I have discovered that both gelatin and glue in the form of certain of their compounds with lower fatty acids, for example, their acetates, are not so hardened but, on the contrary, dissolve in formaldehyde; and that the product obtained by condensing such an acetate-containing formaldehyde with phenol; or by admixing the gelatin acetate with an undistilled phenol-formaldehyde condensation product may be a colourless liquid which is completely stable at ordinary temperatures and has definite properties according to the proportion and identity of the gelatin compound. In other words, the gelatin compound serves to inhibit the progressive reaction of phenol and formaldehyde which takes place at ordinary room temperatures.

This liquid can, by dehydration, preferably in vacuo, be converted first to a stable liquid resin and subsequently to a solid permanently fusible or permanently infusible resin by appropriate heat treatment.

In the distillation, excess phenol is distilled off and excess aldehyde is combined with the gelatin acetate. The liquid resin thus produced is stable at ordinary temperatures but can be converted to a solid resin by heating in open moulds, the characteristics of fusibility or infusibility depending on the time and temperature of the heating. Other characteristics such as hardness, elasticity, flexibility and shock resistance depend primarily on the amount and identity of the gelatin acetate used and to a lesser degree on the proportions and identities of the phenolic and aldehydic bodies. Thus, one can produce a flexible, elastic, fusible or infusible resin or a hard, tough, shock resistant, fusible or infusible resin. The hardening or curing period can be as little as one hour and the temperature can be anything up to just below the temperature at which charring would commence, without sacrificing the colour or other desired qualities of the finished resin. As compared with the ordinary cast phenolic resins known on the market, the new modified resins have definitely improved qualities of elasticity, flexibility, shock resistance and permanency of surface brilliance. Also, they have improved dielectric and machining properties.

The colour of the new modified resins depends on the phenolic body used. Water-white or colourless resins are obtained using purified phenol, while resins made using other phenols, such as cresol, are yellow, brown or black. The colour is absolutely stable. The colourless resins remain so even after prolonged heating or prolonged exposure to sunlight.

The liquid resins may be admixed with dyes, pigments and fillers before conversion to the solid state. The solid fusible resins may be so admixed by use of solvents in the well known manner. The liquid phenol-formaldehyde resins and the fusible solid resins derived therefrom are soluble in all hydrocarbon solvents and also in alcohols such as ethyl, methyl, isopropyl, acetone, and diacetone alcohols, acetone, toluene, chloroform, ethylene glycol and numerous commercial solvent mixtures but the infusible resins are not soluble in these solvents and are unaffected by strong alkalis and by most acids. The properties of the new resins render them useful for all purposes for which known phenol-aldehyde resins may be used and also for many purposes for which ordinary phenol-aldehyde resins are not applicable.

The term "gelatin" is herein used generically and includes animal and vegetable glues and gelatins made therefrom. The acetate are prepared, broadly speaking, by reacting together gelatin swelled in water and/or dissolved in glycerin, with glacial acetic acid, in presence of a catalyst and with heating.

For purposes of this invention, the gelatin or glue used must be carefully selected as to its pH, jelly, viscosity and strength. A large jellying power is to be avoided and therefore glue having a pH between 4.0 and 5.0 should be avoided for best results.

As gelatin-fatty acid reaction products are not well known substances, specific examples are given of the preparation of some of these which are suitable as modifying agents in phenol-aldehyde resins, but it is to be understood the invention is not limited to the particular gelatin-fatty acid compounds herein disclosed, as others may be used to produce different characteristics in the final resin.

In the following examples the parts are all by weight, unless otherwise stated.

*Example 1.*—Gelatin from animal glue, having a pH of 6.4 is selected and 920 parts of this gelatin is soaked in 4600 parts of water for 24 hours, then 920 parts of glycerin is thoroughly admixed and the whole heated up to 100° C. At that temperature, 600 parts of glacial acetic acid (at least 99.9% pure) is added and the temperature raised to 140° C. and maintained for 2 hours. At the end of this period of time, there is added approximately 7 parts of a catalytic mixture prepared by boiling together under reflux for 30 minutes:

| | Parts |
|---|---|
| 40% hydrochloric acid | 3 |
| Borax | 30 |
| 100% nitric acid | 5 |
| Glycerin | 60 |
| Quinine acetate | 2 |

The heating is continued until a sample taken shows a pH reading between 2.2 and 3.0, at a temperature of 28° C. The mass is then allowed to cool quietly for 24 hours and is then ready for use after being filtered. The product is believed to be a stable tri-acetate of gelatin.

*Example 2.*—An abieto-acetate of gelatin may be prepared by incorporating a natural resin, such as colophony, in the mixture of Example 1. The method now preferred is to admix 5 parts of natural resin, for instance colophony, and 6 parts of glacial acetic acid to the product of Example 1 and heat the mixture to boiling for 2 hours. There is then added about 9.2 parts of the catalytic mixture of Example 1 and the whole is heated for 10 minutes at 160° C.

*Example 3.*—A boro-acetate of gelatin is prepared by adding 2.5 parts of boracic acid crystals to the mixture of Example 1, during the reaction.

*Example 4.*—An abieto-boro-acetate is prepared by proceeding as in Example 2 and adding to the reaction 5 parts of boracic acid.

*Example 5.*—The process of Example 3 is followed and during the reaction, 1 part of hexamethylenetetramine is added.

In preparing the new resins, it is immaterial whether the phenol or the aldehyde is in excess. Excess phenol is evaporated out during the dehydration and excess aldehyde is combined with or digested by free gelatin acetate molecules. Production of the new type of resins depends on the behaviour of the gelatin acetate which is believed to permit, during polymerization of the resin, a rapid jelling of the gelatin acetate molecules under the vapour pressures at which excess aldehyde is liberated. Some of the gelatin acetate is believed to combine with aldehyde or phenol-aldehyde molecules, while the remainder is free and dispersed through the mass and acts as a plasticiser. It is to be noted, however, that certain of the improved characteristics of the new resins are believed to be due to chemical interaction of the gelatin acetate and the aldehyde. The gelatin acetate also serves to adsorb any residual water that cannot be removed by vacuum distillation, so that the solid resin product does not contain free water, free phenol or free aldehyde, and is therefore a completely stable product.

The following examples disclose various methods of preparing the new modified phenol-aldehyde resins, but it will be understood the invention is not limited to the phenols, aldehydes, gelatin derivatives, proportions, temperatures and times given in these examples.

*Example 6.*—To 6 parts of pure phenol crystals there is added 9 parts of 40% formaldehyde and the temperature is raised to 80° C. At this time, 2% (based on the weight of phenol) of sodium bicarbonate or caustic soda, or an equivalent amount of any other alkaline substance known as a catalyst or condensing agent in the phenol-aldehyde reaction, is added and the temperature raised to 100° C. and the mixture heated under reflux for exactly 1 hour. At the end of this time 7% (based on the weight of mixture) of gelatin acetate prepared according to Example 1 is admixed and the mass dehydrated under vacuum. The temperature is at first kept at about 50° C. by steam or other suitable heating and then gradually rises. When the temperature reaches 100° C., the mass is poured into storage containers and allowed to cool, uncovered. When cold, the resin is a syrupy colourless liquid ready to be cast in moulds and hardened by heating.

This liquid is stable as to colour, even on long exposure to sunlight, and does not polymerize, even on long standing at summer atmospheric temperatures. Solid fusible and infusible resins made from the liquid by heating have greater flexibility, elasticity and toughness than ordinary phenol-formaldehyde resins.

The viscosity of the liquid and the characteristics of the solid products made therefrom vary according to the amount of gelatin acetate combined, both chemically and as free dispersed acetate. The qualities of flexibility and elasticity increase as the amount of gelatin acetate in the resin is increased. Also, increase in the amount of gelatin acetate produces other desirable characteristics. For example, if the amount of gelatin acetate is increased to 21%, the solid resins will have improved lustre, brilliance, depth of colour (if colouring matter has been added), transparency and machining qualities and shock resistance. The amount of gelatin acetate incorporated may, for certain purposes, be less than 7% or more than 21%.

*Example 7.*—Final products which have greater rigidity than those of Example 6 are prepared according to that example, except that an abieto-acetate of Example 2 is substituted for the pure gelatin acetate of Example 1 in any of the amounts specified in Example 6.

*Example 8.*—If it is desired to hasten the hardening of the resins of Example 6, there may be incorporated in the reaction mixture from 5% to 10% of boracic acid, or the gelatin boro-acetate of Example 3, in the amounts specified in Example 6. The solid products are harder than those of Examples 6 and 7.

*Example 9.*—The process of Example 6 is carried out, substituting the abieto-boro-acetate of Example 4 for the pure gelatin acetate of Example 1. The final solid products have the combined properties of the resins of Examples 7 and 8.

*Example 10.*—The process of Example 8 is followed and during the reaction, 1 part of hexamethylenetetramine is added. The final solid products are harder than those of Example 8.

*Example 11.*—The process of Example 6 is carried out but with the difference that a part of the gelatin acetate is admixed with the phenol and formaldehyde before the condensation, and the balance during the dehydration, when the water commences to liberate the resin. In this case, the alkaline catalyst of Example 6 should be omitted to avoid neutralizing the acidity of the gelatin acetate, which serves to catalyze the reaction.

*Example 12.*—The process of Example 6 is carried out substituting cresol for the phenol of the example. The resin produced has the same characteristics of flexibility, elasticity, toughness, hardness and machining properties but is coloured.

*Example 13.*—The process of Example 6 is carried out substituting an equivalent amount of acetaldehyde for the formaldehyde of the example. The resin produced has characteristics similar to those of the resin of Example 6.

*Example 14.*—The process of Example 6 is carried out substituting equivalent amounts of cresol and furfural for the phenol and formaldehyde of the example. The resin obtained has characteristics similar to those of Example 12.

The resins obtained according to the foregoing examples are compatible with natural resins, drying and non-drying oils, plasticizers such as stearic acid, paraffine wax, oleic acid, ethyl lactate, camphor, ester oil and are also compatible with cellulose acetate and, if a stabilizing agent is used, with cellulose nitrate.

The processes of Examples 6 to 14 may also be carried out using as catalyst a small amount of a strong acid, for example one part of acid per 1000 parts of phenol, in which case it is preferable to carry out the condensation under partial vacuum. The alkaline catalysts are preferred since the reaction is then more controllable.

Also, while the gelatin acetates disclosed in Examples 1 to 5 are those now preferred for incorporation in phenol-formaldehyde resins, it is to be understood they may be used in other phenol-aldehyde resins and that other reaction products of gelatin and a lower fatty acid may be used, either in phenol-formaldehyde resins or in other phenol-aldehyde resins.

Resins may be made following, in general, the teachings of Examples 6 to 14, but using equivalent amounts of propyl aldehyde, butyl aldehyde or other aldehydic bodies.

This application is a continuation-in-part of my earlier application, Serial No. 188,136, filed February 1, 1938.

Having thus described my invention, I claim:

1. A synthetic resinous mass being a condensation product of a phenol and an aldehyde and containing as modifying agent, a formaldehyde-soluble reaction product of gelatin and a lower fatty acid.

2. A synthetic resinous mass being a condensation product of a phenol and an aldehyde and containing as modifying agent, a formaldehyde-soluble reaction product of gelatin and glacial acetic acid.

3. A synthetic resinous mass being a condensation product of a phenol and formaldehyde and containing as modifying agent, a formaldehyde-soluble reaction product of gelatin and a lower fatty acid.

4. The product resulting from condensing together a phenol and an aldehyde, admixing a formaldehyde-soluble reaction product of gelatin and a lower fatty acid and substantially completely dehydrating the mixture.

5. The product resulting from condensing together a phenol and an aldehyde, admixing a formaldehyde-soluble reaction product of gelatin and a lower fatty acid, substantially completely dehydrating the mass and finally hardening the mass by heating the same.

6. A synthetic resinous mass being a condensation product of a phenol and an aldehyde and containing a formaldehyde-soluble abieto-acetate of gelatin as a modifying agent.

7. A synthetic resinous mass being a condensation product of a phenol and an aldehyde and containing a formaldehyde-soluble abieto-boro-acetate of gelatin as modifying agent.

8. A process of making synthetic resinous material, which process comprises, condensing together a phenol and an aldehyde, admixing a formaldehyde-soluble reaction product of gelatin and a lower fatty acid with the phenol-aldehyde condensation product and substantially completely dehydrating the mixture in vacuo.

9. A process of making synthetic resinous material, which process comprises, condensing together a phenol and formaldehyde, admixing a formaldehyde-soluble reaction product of gelatin and acetic acid with the phenol-aldehyde condensation product and substantially completely dehydrating the mixture in vacuo.

10. A process of making synthetic resinous material, which process comprises, condensing together a phenol and an aldehyde and a formaldehyde-soluble reaction product of gelatin and a lower fatty acid and substantially completely dehydrating the mass.

11. A process of modifying phenol-aldehyde condensation products, which process comprises, admixing a formaldehyde-soluble reaction product of gelatin and a lower fatty acid with the phenol-aldehyde reaction mixture at any stage of the reaction thereof prior to the separation of water and, when the condensation is complete, dehydrating the mass.

12. A synthetic resinous mass being a condensation product of a phenol and formaldehyde and containing a modifying agent including a formaldehyde-soluble reaction product of gelatin and glacial acetic acid.

13. A synthetic resinous mass being a condensation product of a phenol and an aldehyde and containing as modifying agent a member of the group consisting of formaldehyde-soluble acetates of gelatin, abieto acetates of gelatin and boro-abieto acetates of gelatin.

JEAN BAPTISTE MONIER.